United States Patent Office 3,004,821
Patented Oct. 17, 1961

3,004,821
STABILIZED GASOLINE-SOLUBLE DISAZO DYE COMPOSITIONS AND PROCESS OF PREPARING SAME
Robert D. Gano, Wilmington, Del., assignor to E. I. du Pont de Nemours and Company, Wilmington, Del., a corporation of Delaware
No Drawing. Filed Nov. 19, 1957, Ser. No. 697,339
3 Claims. (Cl. 8—3)

This invention is directed to novel stable disazo dye compositions and a process for preparing these free-flowing, storage-stable, red disazo dye powder compositions which are useful in coloring gasoline. In modern gasoline refineries, the dyes used for coloring the gasoline are often added through eduction pipes. This method makes it essential that the dye powders are free-flowing, meaning that they must not cake upon storage, as is the tendency, particularly in hot warehouses.

The inventor faced the problem of determining the cause of caking in disazo red dye powders used for coloring gasoline. Once the caking on storage was discovered to be associated with the change from an unstable crystalline form to a stable crystalline form, the problem was one of producing the stable form directly in manufacture. Associated with the main problem of storage stability were the usual requirements of shade, strength, solubility in gasoline, and free-flowing properties. The dyes used must dissolve at least to the extent of 0.25 to 0.40 milligram in 100 ml. of isooctane (the usual concentration in the gasoline before sale), if the refiner educts dye directly into the gasoline, and preferably to the extent of 100 to 500 milligrams in 100 ml. of isooctane when the refiner educts or pours dye powder into a solvent to prepare a concentrated solution, latter added to the final gasoline.

It is an object of the present invention to provide novel stable disazo dye compositions and a process for preparing these disazo dye powder compositions, the dye powders of which do not cake on storage and are suitable for coloring gasoline stocks. A further object is to change at least 5% of the polymorphic dye powders in a dye mixture to the beta form by heating at about 80° C. or higher as more fully described herein. These and other objects will become apparent in the following description and claims.

It is to be understood that by the terms "alpha" and "beta" is meant the one or more metastable "alpha" crystal forms and the stable "beta" crystal form. These terms do no imply that the stable beta crystal form of one polymorphic dye has the same crystal lattice as the beta form of a different polymorphic dye. For instance, the beta or stable crystal of "Sudan IV" (1-(4-o-tolylazo-o-tolylazo)-2-naphthol) is in the form of needles; the alpha I and alpha II forms of "Sudan III" (1-(p-phenylazo-phenylazo)-2-naphthol) are also needles while its stable beta form is in a different crystal lattice.

More specifically, the present invention is directed to novel stable disazo dye compositions and processes for their manufacture whereby a soft, free-flowing disazo dye powder, stabilized against caking due to change in crystal phase during storage, is prepared from an unstable crystalline form of a dye of the group (a) 1-(p-phenylazo-phenylazo)-2-naphthol, (b) 1-(4-o-tolylazo-o-tolylazo)-2-naphthol, (c) 1-(4-phenylazo-2,5-xylylazo)-2 - naphthol, (d) 1-(4 - o - tolylazo - 2,5 - xylylazo)-2-naphthol, and (e) 1-[4-(2,4-xylylazo)-2,5-xylylazo]-2-naphthol, or any mixture of these dyes, by heating said dyes, under selected wet or dry conditions, at about 80° to 100° C. until at least 5% by weight of the product is converted to the stable beta crystalline form. When the dye is heated in an aqueous slurry, the heating step is followed by filtering, washing, drying and grinding the stabilized dye. The stabilization process may be conducted in the presence of a nonpolymorphic isomer or homolog of the polymorphic dyes, the amount of the polymorphic type being at least 30% of the total weight of dyes in the mixture; the stabilizations may also be conducted in the presence of an inert, colorless resin in an amount which does not exceed 35% of the dye weight.

It is not necessary to convert more than a part of the polymorphic dye to beta form by the method of this invention, since a small amount in beta form, as described, is sufficient to effect stabilization; however, all or essentially all of the alpha crystals may be converted to the beta crystal form at high temperatures.

In the present invention, one may use mixtures of the polymorphic dyes with or without nonpolymorphic types and/or inert solid diluents. The dye mixture subjected to the process of the present invention should contain no less than 30% of the polymorphic dye, and no single polymorphic dye should constitute more than 90% of the total mixture of dyes. The dye mixture is stabilized by heating and drying the dye mixture at a temperature of 80° C. or higher but below the melting point of the dyes until at least 5% by weight of the polymorphic dye or dyes is converted to the beta crystalline form.

When the compositions of the present invention are produced in a hot aqueous slurry, stabilization is succussful at a pH as high as 11 while maintaining a temperature of about 80° C. or higher prior to isolating the dye; a pH of 8 or lower is preferred because the stabilization is completed more rapidly. Stabilization has been effected in this process at a pH as low as 1. Since the stabilization may be completed near the neutral point, the use of a large amount of acid is unnecessary.

The total amount of polymorphic dyes stabilized according to the present invention can vary from 30% to 100% of the dye mixture. Also, there should be at least 10% of a different dye (or dyes), either polymorphic or nonpolymorphic, in order to assure good solubility in gasoline. Since the minimum polymorphic dye content is 30% and at least 5% of the polymorphic portion must be converted to the beta form, it is clear that the minimum beta content of the dye mixture to assure stability is 1.5%. The nonpolymorphic dyes do not cake on storage as there is no transition of crystal forms and a mixture consisting of essentially less than 30% of polymorphic dyes plus more than 70% of non-polymorphic dyes does not cake because of the great dilution by the latter type. Generally, the nonploymorphic dyes have little or no merit as gasoline colors because they are too yellow, too weak or too expensive to manufacture free of polymorphic dyes.

Representative examples illustrating the present invention follow.

EXAMPLE 1

(a) *Unstabilized dye.*—2-methyl-4-(o-tolylazo)aniline (1 mole) was diazotized in dilute, aqueous hydrochloric acid by the addition of aqueous sodium nitrite solution, in known manner. The cold solution of diazotized intermediate was coupled to 1.08 moles of beta-naphthol in cold, alkaline, aqueous solution, in known manner.

The slurry of "Sudan IV," 1-(4-o-tolylazo-o-tolylazo)-2-naphthol, thus obtained was made strongly alkaline by the addition of aqueous sodium hydroxide and heated to about 75° C. to dissolve unreacted beta-naphthol. The slurry of dye was filtered and washed with water until neutral. This wet dye was dried for two days by the customary manner in an oven at 50° to 55° C., then ground to a fine powder.

The ground dye was a free-flowing, soft powder. When examined microscopically, the dye particles were without apparent regular shape. When examined by X-ray diffraction methods, the powder was found to be crystalline. The major diffraction maxima, using the characteristic radiation of copper (K-alpha line), were at 5.9, 11.5, 12.8, 18.5, 24.6, 26.6 and 28.8 degrees (alpha type of crystal).

When the dye powder was stored in an accelerated caking test at 60° C., it caked severely within four days. This dye would be unsuitable for powder-feeding systems of the eductor type at gasoline refineries.

(b) *Stabilized dye.*—Another preparation was made as described in part (a) of this example, except that the aqueous, alkaline dye slurry at 75° C., was not filtered. Instead, it was acidified with aqueous hydrochloric acid to a strong test on Congo red paper. The acidic slurry was heated at 95° C. for one-half hour to promote the desired crystal change. This slurry of stabilized dye was made strongly alkaline with aqueous sodium hydroxide to redissolve any excess beta-naphthol. The dye was filtered, washed, dried and ground as described in part (a).

The stabilized dye powder had essentially the same tinctorial strength, shade and solubility in gasoline, also the same melting point, as the unstabilized sample. However, the stabilized sample remained a soft, free-flowing powder after storage for four days at 60° C. followed by two days at 80° C. Also, this stabilized dye was found to contain only needle-shaped crystals which gave characteristic, major diffraction maxima with X-rays, as described, at 10.4, 12.0, 13.7, 14.2, 17.9, 20.2, 24.5, 25.8, and 28.3 degrees (beta type of crystal).

The process of part (b) of this sample was repeated in a series of experiments in which the pH varied in small intervals from 1 to 11. Stabilized dye was obtained in all these experiments. In this series, stabilization tests were made on samples removed over short intervals of time and it was found that the conversion to beta-form, sufficient for stabilization, was completed in less than twenty minutes at all pH values below 11. At the temperature employed (95° C.), the conversion to beta-form was 100% in less than twenty minutes in all experiments conducted at a pH of 8 or below.

It is evident that the novel crystal properties of the stabilized dye imparted resistance to caking on storage.

EXAMPLE 2

(a) *Unstabilized dye.*—4-phenylazo-2,5-xylidine hydrochloride (1 mole) was diazotized in dilute, aqueous sulfuric acid medium by the addition of aqueous sodium nitrite solution, in known manner. The solution of 4-phenylazo-2,5-xylenediazonium sulfate was added to a cold, aqueous, alkaline solution of beta-naphthol (1.11 moles).

The resulting slurry of red dye, 1-(4-phenylazo-2,5-xylyazo)-2-naphthol, was made strongly alkaline with sodium hydroxide and heated to about 75° C. then isolated, dried at 50° to 55° C. and ground as described in Example 1(a).

This dye was initially a free-flowing, soft powder with no regular crystal form apparent under 1,000× magnification. However, when examined by X-ray methods, this dye was found to be crystalline with major diffraction maxima 8, 10.8, 11.7, 12.6, 13.6, 15.7, 16.3, 17.2, 19.1, 22.4, 24.0, 24.8, 25.5 and 29.0 degrees (alpha I type).

When this dye powder was stored in an accelerated caking test, it caked after two days at 60° C., followed by one day at 80° C. After eleven days at 80° C., visible needle-shaped crystals had appeared in the caked dye.

(b) *Stabilized dye.*—Another preparation was made as in part (a) except that the alkaline slurry of the dye in alpha I crystal form was acidified to Congo red paper with hydrochloric acid and heated for one hour at 95° C. The slurry of stabilized dye was made strongly alkaline with sodium hydroxide and then filtered and worked up as described in Example 1(a).

The stabilized dye powder had essentially the same tinctorial strength, shade and solubility in gasoline, also the same melting point, as the unstabilized dye. However, it contained microscopically visible, needle-shaped crystals and aggregates with similarly shaped projections. It remained a soft, free-flowing powder after 2 days' storage at 60° C., followed by eleven days at 80° C. The X-ray diffraction maxima of the stabilized dye were different from those of the unstabilized dye. Major maxima were found at 6.2, 8.6, 10.5, 11.0, 12.5, 17.2, 18.0, 19.4, 20.2, 21.0, 24.2, 26.0 and 28.0 degrees (beta crystals).

This dye is also obtained in a second metastable crystal form (alpha II), apparently depending upon undefined variations in the preparation, which metastable form can likewise be stabilized as described above. The X-ray diffraction maxima of the alpha II form are found at 6.9, 8.1, 11.8, 12.7, 13.6, 15.8, 16.3, 17.3, 19.8, 22.4, 23.9, 25.6, 26.3 and 29.2 degrees.

It is evident that the novel crystal properties of the stabilized dye imparted resistance to caking on storage.

EXAMPLE 3

*Stabilization of a mixture of two polymorphic dyes*

2-methyl-4-(o-tolylazo)aniline (1.40 moles) and 4-phenylazo-2,5-xylidene hydrochloride (0.68 mole) were diazotized in an aqueous medium of mineral acids by the addition of aqueous sodium nitrite solution, in known manner. The cold solution of diazonium salts, derived from the two above intermediates, was coupled to 2.2 moles of beta-naphthol, in cold aqueous solution made alkaline with NaOH, and heated to about 50° C. while strongly alkaline.

(a) This slurry of unstabilized dye was divided; half was filtered and washed with water, in the usual manner. This unstabilized wet dye filtered cake was further divided; part was dried in the usual manner at 50° to 60° C. for two days, and another part was dried and stabilized by heating in an air oven for two days at 95° C., a temperature sufficiently high to fuse some commercial red gasoline dyes based on "Sudan IV" because of the presence of isomers and impurities.

(b) The remaining half of the unstabilized, alkaline slurry of dye, while at 50–60° C. was acidified by adding aqueous hydrochloric acid to a strong test on Congo red paper. It was agitated and heated to 95° C. which temperature might be expected to cause melting and tarring of ordinary commercial dyes, based on "Sudan IV" with a mixture of other dyes, since appreciable excess of beta-naphthol (melting point 122° C.) is usually present and precipitated in part by acidification. The dye slurry was sampled after agitation for 6 minutes at 93–95° C., again after 30 minutes and finally after an hour. At this time, the main portion as well as the samples were made strongly alkaline, pH 11–12, with sodium hydroxide, filtered, washed, dried at 50° C. and ground.

The main portion of the stabilized, acidic dye slurry was similarly made alkaline and washed after filtration. A part was dried in the normal manner at 50° C. and another part at 95° C. for two days. The dye samples were ground.

Accelerated (3 days at 60° C. plus 2 days at 70° C.) and ordinary temperature (4 months) caking tests, solubility and tinctorial properties in gasoline, and X-ray diffraction tests showed successful stabilization by either the high temperature (95° C.) treatment of wet, filtered, unstabilized dye part (a) or by the hot, acidic slurry treatment part (b). The only sample not stabilized was the one that was filtered prior to acid treatment and dried at 50° to 60° C. It caked severely in less than 3 days' storage at 60° C.

Tinctorial strengths in gasoline were unchanged by the various stabilization methods.

The unstabilized dye powder contained only alpha-type crystals of "Sudan IV" and 1-(4-phenylazo-2,5-xylylazo)-2-naphthol by X-ray diffraction test. The heat-stabilized sample contained about 95% of the "Sudan IV" component in beta form and appreciable amounts of both alpha and beta crystals of the other dye. All of the acid slurried samples contained at least 5% of the dye in beta form.

A similar sample of wet dye, dried and stabilized at 116° C. for two days, was similarly stable.

EXAMPLE 4

*Stabilization of polymorphic dyes in mixtures with non-polymorphic dyes in the absence or presence of colorless diluents*

(a) *One polymorphic dye and one non-polymorphic dye.*—A mixture was prepared containing the alpha or unstable form of "Sudan IV," and the stable nonpolymorphic dye, 1 - [4-(2,3-xylylazo)-2,5-xylylazo]-2-naphthol as follows:

2-methyl-4-(o-tolylazo)aniline was mixed with 4-(2,3-xylyazo) - 2,5 - xylidine hydrochloride in approximately 75:25 molar ratio (total 1 mole). This mixture of amines was diazotized in known manner in dilute, aqueous hydrochloric acid medium by the addition of aqueous sodium nitrite solution. The cold solution of diazotized intermediates was coupled in known manner with 1.05 moles of beta-naphthol in a cold, aqueous solution made alkaline with NaOH.

This alkaline slurry of water-insoluble dyes was heated to about 50° C. A part was filtered, washed with water, dried at 50° to 55° C. and ground.

Another part of the dye slurry was stabilized by the addition of hydrochloric acid and heating at 95° C. for 1 hour as described for "Sudan IV" in Example 1(b). The slurry of stabilized dye was made alkaline with sodium hydroxide, filtered, washed, dried at 50° to 55° C. and ground.

Comparison of the two dye powders was made by X-ray diffraction examination and by accelerated caking tests.

The first sample obtained from the alkaline slurry was unstabilized and contained only the alpha crystals of "Sudan IV" and crystals of 1-[4-(2,3-xylylazo)-2,5-xylylazo]-2-naphthol. It caked on accelerated testing at 60° and 80° C.

The mixture that was stabilized by acid treatment was found to contain both alpha and beta crystal forms of "Sudan IV" and crystals of the accompanying dye. The powder remained a free-flowing material after exposure to temperatures of 60° and 80° C., as described in Example 1.

(b) *Two polymorphic dyes and one nonpolymorphic dye.*—A mixture of 0.3 mole of 2-methyl-4-(o-tolylazo)-aniline, 0.1 mole of 4-phenylazo-2,5-xylidine hydrochloride and 0.6 mole of 4-phenylazo-2,3-xylidine hydrochloride [the latter was made in known manner by coupling benzenediazonium chloride to the omega sulfonic derivative of 2,3-xylidine and then hydrolyzing in alkaline medium to regenerate the free amino group of the 4-phenylazo-2,3-xylidine] was diazotized in known manner in dilute, aqueous hydrochloric acid medium by the addition of aqueous sodium nitrite solution. These diazo intermediates were coupled with 1.1 moles of beta-naphthol in dilute aqueous NaOH solution to which had been added 20% by weight (calculated on final dyes) of powdered, water-insoluble, gasoline-soluble organic polymer. The polymer was "cumar" resin (trademark of Barrett Div., Allied Chemical Dyes Corp.—see "The Condensed Chemical Dictionary," Francis M. Turner, Ed Dir., 4th Ed., 1950, page 200), a synthetic resin mixture of polymerized coumarone, indene and associated coal-tar compounds. The alkaline slurry of the polymer and three dyes was divided into two parts. One part was filtered at 50° C. washed alkali-free, dried at 50° to 55° C. and ground. The other part was stabilized by following the acidic treatment described in part (a) of this example. The two samples were compared by X-ray diffraction and by accelerated caking tests. The stabilized sample contained about 5% of beta crystals of "Sudan IV" and 1-(4-phenylazo-2,5-xylylazo)-2-naphthol and did not cake on storage at elevated temperatures. By contrast, the unstabilized sample caked in the same storage test (3 days at 70° C. and 3 days at 80° C.) and no beta crystals were detected in the X-ray analysis. The polymorphic dyes were present as alpha crystals and the nonpolymorphic dye, 1-(4-phenylazo-2,3-xylylazo)-2-naphthol, was present in crystalline form along with particles of the amorphous polymer.

The same results were obtained when the experiment was repeated except that the polymer was not added to the coupling reaction mass, but was ground into the isolated dye powders following their respective treatments but prior to tests for stability.

EXAMPLE 5

*Stabilization of polymorphic dye mixtures*

Mixtures of 2-methyl-4-(o-tolylazo)aniline and 4-phenylazo-2,5-xylidine hydrochloride were diazotized and coupled to an excess of beta-naphthol by the methods described at the beginning of Example 3. The ratio of the two polymorphic dyes thus obtained; "Sudan IV" to 1-(4-phenylazo-2,5-xylylazo)-2-naphthol, was 25:75 in one series of samples and 50:50 in a second series of samples.

The dye mixtures were divided and treated, as described in Example 3, except that the samples stabilized by high temperature drying were held at 100° C. for 16 to 20 hours and that those stabilized by the hot acidic slurry method were agitated at 95° to 100° C. for 4 hours.

The degree of conversion from the unstable alpha crystal form to the stable beta form, for each dye in this mixture, is shown as follows:

Dye A—"Sudan IV" or 1-(4-o-tolylazo-o-tolylazo)-2-naphthol.
Dye B—1-(4-phenylazo-2,5-xylylazo-2-naphthol.

25:75 MIXTURE

| Method | Percent beta-form | | Percent alpha-form | |
|---|---|---|---|---|
| | Dye A | Dye B | Dye A | Dye B |
| Drying, 60° C | none | none | 100 | 100 |
| Drying, 100° C | >95 | >50 | trace | <50 |
| Acid Slurry | 15 | <50 | 85 | >50 |

50:50 MIXTURE

| Method | Percent beta-form | | Percent alpha-form | |
|---|---|---|---|---|
| | Dye A | Dye B | Dye A | Dye B |
| Drying, 60° C | none | none | 100 | 100 |
| Drying, 100° C | 100 | >50 | none | <50 |
| Acid Slurry | 20 | (¹) | 80 | (²) |

¹ Beta present.
² Alpha present.

Storage stability tests were conducted for 3 days at 60° C., then 4 days at 70° C., then 3 days at 80° C. All samples containing beta crystals were stable, the others caked at 60° C. Thus, the relative amounts of the two polymorphic dyes can be changed without affecting the successful stabilization of the dye mixtures by either method.

EXAMPLE 6

*Stabilization of "Sudan IV" powders*

Powdered alpha crystals of "Sudan IV" (1 part) prepared as described in Example 1(a) and containing less than one percent of beta-naphthol were agitated in 16 parts of water, alkaline to Clayton yellow paper with sodium hydroxide, and heated to 60° C. Hydrochloric acid was added until a blue test was observed on Congo red paper, and the slurry was heated to 95° C. for two hours. After realkalizing to Clayton yellow paper test with sodium hydroxide, the dye was filtered, washed, and dried for two days at 60° C. and ground.

Accelerated caking tests showed that the dye was non-caking after 3 days at 60° C., followed by 3.5 days at 70° C. X-ray examination showed only beta crystals of the dye.

This test illustrates that "Sudan IV" can be stabilized by the hot-acidic-slurry method after the dye has been obtained as the alpha crystals in dry form.

EXAMPLE 7

One mole of 4-(o-tolylazo)-2,5-xylidine, (prepared in known manner by coupling diazotized o-toluidine to 2,5-xylidine) was diazotized in dilute, aqueous hydrochloric acid medium by the addition of aqueous sodium nitrite solution. The resulting solution of the diazonium chloride was coupled to 1 mole of beta-naphthol in cold NaOH solution to give an alkaline slurry of 1-(4-o-tolylazo-2,5-xylylazo)-2-naphthol. The dye slurry was heated to 60° C., the dye was filtered off, washed, dried at 50° to 60° C. and ground.

Prolonged storage of this unstable dye powder showed caking at normal temperatures.

Part of this unstable dye powder (alpha crystals) was recrystallized from benzene and air dried at room temperature to produce the stable beta crystal form.

Another part was stabilized by heating at 100° C. for two days and regrinding.

Another portion was stabilized by slurrying 6 parts of the powdered alpha crystals with 94 parts of water, alkalizing with sodium hydroxide to Clayton yellow paper test, heating to 60° C., acidifying with hydrochloric acid to Congo red paper test, and heating at 90° to 95° C. for two hours. Then the dye slurry was made alkaline to Clayton yellow paper test with sodium hydroxide, the dye was filtered off, washed, dried at 60° C., and ground.

When the last three dye powders were examined by X-ray and subjected to accelerated caking tests, it was clear that all of them had been stabilized and converted to beta type crystals.

The unstable powder, examined by the X-ray diffraction method described in Example 1 was found to be crystalline with the higher maxima at 5.9, 11.3, 13.0, 18.7, 24.5–24.7, 26.6 and 28.9 (alpha type).

Similarly examined, the stabilized dye samples were crystalline with the higher maxima at 10.4, 11.9, 13.7, 18.0, 20.0, 23.4, 24.4, 25.6 and 28.2 degrees (beta type).

EXAMPLE 8

One mole of 4-(2,4-xylylazo)-2,5-xylidine, (prepared in known manner by coupling diazotized 2,4-xylidine to 2,5-xylidine) was diazotized and coupled in dilute NaOH solution to 1.1 moles of beta-naphthol. The alkaline slurry of 1-[4-(2,4-xylylazo)-2,5-xylylazo]-2-naphthol was heated to 60° C., the dye was filtered off, washed, dried at 50° to 60° C. and ground.

Prolonged storage of this unstable dye powder showed caking at normal temperatures.

When this dye was treated by the three stabilization methods described in Example 7 stabilized samples were obtained as shown by accelerated caking tests and by X-ray diffraction examination. The unstable dye was found to be in alpha crystalline form. The crystals obtained from benzene were entirely in beta form, and those obtained in the high temperature drying and acid slurry treatments were mostly alpha mixed with some beta crystals.

The X-ray diffraction maxima, as determined by methods of Example 1, were: 5.9, 11.4, 12.9, 18.7, 24.4, 26.5 and 28.7 degrees (alpha type); and 10.3, 11.8, 13.5, 17.8, 20.2, 24.3, 25.6, and 28.1 degrees (beta type).

EXAMPLE 9

One gram-mole of "Sudan III," 1-(p-phenylazophenylazo)-2-naphthol, was prepared from diazotized p-phenylazoaniline and an aqueous, alkaline solution of beta-naphthol, in known manner. The slurry of dye was heated to about 60° C. and divided.

One part of the slurry was filtered and the dye was washed alkali-free. A part of this wet dye filter cake was dried at 50° C. for 4 days, and another part was stabilized by drying at 90° C. for two days. Both samples were ground to soft powders.

Another part of the dye slurry was acidified with hydrochloric acid to a strong test on Congo red paper and then heated at 95° C. for one hour. This slurry of stabilized dye was realkalized with sodium hydroxide to a test on Clayton yellow paper, filtered, and the dye was washed alkali-free. Part of this stabilized wet dye was dried at 50° C. for 4 days and another part at 90° C. for 2 days. Both samples were ground to powders.

Accelerated caking tests showed that all of the stabilized samples were soft, free-flowing powders after storage for 6 days at 60° C. and 4 more days at 70° C., while the untreated sample caked after the same exposure and changed color (as a powder) from red to a brownish red color. Other properties of the samples were equal, e.g., hue in gasoline, melting point, and tinctorial strength in gasoline solution.

X-ray powder diffraction tests showed that the stabilized samples contained alpha I, alpha II and beta crystals whereas the unstabilized sample was entirely in the alpha I form.

The alpha II, metastable crystal can be obtained by recrystallization from glacial acetic acid, whereas the normal alpha I metastable crystal results from ordinary aqueous manufacture or recrystallization from benzene.

The major maxima by X-ray diffraction examination are: (1) alpha I type at 6.5, 7.4, 9.1, 10.0, 12.0, 12.8, 13.2, 13.7, 15.5, 16.2 and 26.6 degrees; (2) alpha II type at 5.1, 7.8, 12.8, 14.6, 15.6, 16.3 and 18.6 degrees; and (3) beta type at 11.4, 13.6, 18.9, 19.9, 20.2, 21.8, 24.7, 26.2, 27.0, 28.2, 29.0 and 34.8 degrees. An amorphous form can be obtained by solution and precipitation from sulfuric acid.

The polymorphic dyes described in Examples 7, 8 and 9 may be utilized and stabilized in mixtures according to the present invention.

In the present high temperature drying process, it has been found that the polymorphic dyes can be stabilized against caking on storage when about 5% or more of the alpha form has been converted to beta form. This condition is satisfied when the alkaline-extracted samples of the dyes are heated between 80° C. and their melting points for a period of time ranging from about 15 to 50 hours. As a rule the minimum conditions therefore, are about 80° C. and 15 hours, or until at least 5% of the alpha form has been converted to beta form.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows.

I claim:

1. A process for preparing a gasoline-soluble and free-flowing stabilized crystalline disazo dye powder mixture, in which process at least two polymorphic dyes in their unstable crystalline form and taken from the group consisting of (a) 1-(p-phenlazophenylazo)-2-naphthol, (b) 1-(4-o-tolylazo-o-tolylazo)-2-naphthol, (c) 1-(4-phenylazo-2,5-xylylazo)-2-naphthol, (d) 1-(4-o-tolylazo-2,5-xylylazo)-2-naphthol, (e) 1-[4-(2,4-xylylazo)-2,5-xylylazo]-2-naphthol, in such proportion that one of said dyes is present in an amount up to 90% by weight of the mixture, are heated, under anhydrous conditions, at about 80° C. to below the melting temperature of said dyes for a period of from about 15 to 50 hours to convert at least 5% by weight of the original dye mixture to the stable beta-crystalline form, said beta-crystalline form of dye (a) having beta X-ray diffraction maxima at 11.4, 13.6, 18.9, 19.9, 20.2, 21.8, 24.7, 26.2, 27.0, 28.2, 29.0 and 34.8 degrees, said beta-crystalline form of dye (b) having beta X-ray diffraction maxima at 10.4, 12.0, 13.7, 14.2, 17.9, 20.2, 24.5, 25.8 and 28.3 degrees, said beta-crystalline form of dye (c) having beta X-ray diffraction maxima at 6.2, 8.6, 10.5, 11.0, 12.5, 17.2, 18.0, 19.4, 20.2, 21.0, 24.2, 26.0 and 28.0 degrees, said beta-crystalline form of dye (d) having beta X-ray diffraction maxima at 10.4, 11.9, 13.7, 18.0, 20.0, 23.4, 24.4, 25.6 and 28.2 degrees, said beta-crystalline form of dye (e) having beta X-ray diffraction maxima at 10.3, 11.8, 13.5, 17.8, 20.2, 24.3, 25.6 and 28.1 degrees, followed by recovering and grinding said stabilized mixture.

2. A process for preparing a gasoline-soluble and free-flowing stabilized crystalline disazo dye powder mixture, in which process at least two polymorphic dyes in their unstable crystalline form and taken from the group consisting of (a) 1-(p-phenylazophenylazo)-2-naphthol, (b) 1-(4-o-tolylazo-o-tolylazo)-2-naphthol, (c) 1-(4-phenylazo-2,5-xylylazo)-2-naphthol, (d) 1-(4-o-tolylazo-2,5-xylylazo)-2-naphthol, (e) 1-[4-(2,4-xylylazo)-2,5-xylylazo]-2-naphthol, in such proportion that one of said dyes is present in an amount up to 90% by weight of the mixture, are heated at about 85° to 100° C. in an aqueous slurry thereof at a pH not more than 11 for a period of from six minutes to two hours to convert at least 5% by weight of the original dye mixture is converted to the stable beta-crystalline form, said beta-crystalline form of dye (a) having beta X-ray diffraction maxima at 11.4, 13.6, 18.9, 19.9, 20.2, 21.8, 24.7, 26.2, 27.0, 28.2, 29.0 and 34.8 degrees, said beta-crystalline form of dye (b) having beta X-ray diffraction maxima at 10.4, 12.0, 13.7, 14.2, 17.9, 20.2, 24.5, 25.8 and 28.3 degrees, said beta-crystalline form of dye (c) having beta X-ray diffraction maxima at 6.2, 8.6, 10.5, 11.0, 12.5, 17.2, 18.0, 19.4, 20.2, 21.0, 24.2, 26.0 and 28.0 degrees, said beta-crystalline form of dye (d) having beta X-ray diffraction maxima at 10.4, 11.9, 13.7, 18.0, 20.0, 23.4, 24.4, 25.6 and 28.2 degrees, said beta-crystalline form of dye (e) having beta X-ray diffraction maxima at 10.3, 11.8, 13.5, 17.8, 20.2, 24.3, 25.6 and 28.1 degrees, followed by recovering, drying and grinding said stabilized mixture.

3. The process of claim 2 maintained at a pH within the range of 3 to 8.

References Cited in the file of this patent

UNITED STATES PATENTS

| | | |
|---|---|---|
| 1,986,116 | Payne | Jan. 1, 1935 |
| 2,007,386 | Stanley et al. | July 9, 1935 |
| 2,124,590 | Reed | July 26, 1938 |

OTHER REFERENCES

Colour Index, 2nd Edition, volume 3, 1956, page 3207.